United States Patent Office 3,541,053
Patented Nov. 17, 1970

3,541,053
SEGMENTED POLYURETHANES CONTAINING MONODISPERSE HARD SEGMENTS
Leon Lamar Harrell, Jr., Wilmington, Del., assignor to E. I. du Pont de Nemours and Company, Wilmington, Del., a corporation of Delaware
No Drawing. Filed July 30, 1968, Ser. No. 748,641
Int. Cl. C08g 22/00
U.S. Cl. 260—77.5                10 Claims

ABSTRACT OF THE DISCLOSURE

Segmented polyurethanes containing monodisperse hard segments derived from low molecular weight diols and diamines and soft segments derived from polyether glycols. The hard and soft segments are connected bp urethane linkages. The segmented polyurethanes are useful as fibers and in making cast objects.

BACKGROUND OF THE INVENTION

In the art of forming polymers based on urethane linkages, two routes to the urethane structure are well known, i.e., reaction of an isocyanato group with a hydroxyl group, and reaction of a chloroformate group with a primary or secondary amine, with elimination of the elements of hydrogen chloride. The present invention is based on the latter route.

It is generally found that reaction of the bis-chloroformate of any of the relatively simple low molecular weight diols with a primary or secondary diamine in the presence of an acid acceptor such as sodium carbonate will yield a linear, crystalline polymer having a relatively high melting temperature, usually greater than 150° C. and often 30° C. or higher. High-melting, crystalline polyurethanes of this sort are illustrated in U.S. Pat. No. 2,973,333 and 3,089,864, to Katz and Wittebecker.

The strong tendency of polyurethane chains of the sort described by Katz and Wittebecker to associate in a crystalline configuration makes such polymers hard, almost intractable materials. Katz took advantage of the associative tendencies of such "hard" polymer structures in the invention of his U.S. Pat. 2,929,802 by building into an inherently soft polyalkylene based on relatively high molecular weight polyalkylene ether diols randomly placed "hard segments" of the above-described type. The resulting polymers consisted of randomly alternating hard and soft segments, each type occurring in a range of segment sizes, because they resulted from the simultaneous reaction of a diamine, a low molecular weight glycol bis-chloroformate, and a high molecular weight polyalkylene ether glycol bis-chloroformate. The associative tendency of the hard segments is sufficient to give the effect of crosslinks between chains, such that the resulting polymers have valuable elastomeric properties in fiber form.

The hard segments of the prior art segmented polyurethanes are randomly distributed and are of varying length, deepnding on the statistical chance of reaction of diamine with low or high molecular weight bis-chloroformate. The associative tendency of such hard segments is therefore uncontrolled and inefficiently used, which to some extent adversely affects the physical properties of the polymer. Such polymers can be described as containing "polydisperse" hard segments.

SUMMARY OF THE INVENTION

This invention provides segmented ployurethanes comprised essentially of soft segments and monodisperse hard segments of controlled size and distribution, said polyurethanes comprising essentially repeating units of the formula

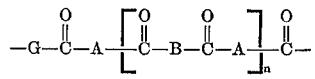

wherein G is a bivalent radical obtained by removing the hydroxyl hydrogen atoms from a polyalkyleneether glycol having a molecular weight greater than 400 and a melting point less than 50° C., B is a bivalent radical obtained by removing the hyrdoxyl hydrogen atoms from a diol having a molecular weight less than 400, A is a bivalent radical obtained by removing a hydrogen atom from each amino group of an organic diamine, and $n$ is an integer of 2–12.

DETAILED DESCRIPTION

The polymers of this invention are composed of two segments: "hard" segments derived from diamines and low molecular weight diols bonded together through urethane linkages,

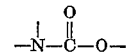

and "soft" segments derived from polyalkyleneether glycols. The soft and hard segments are also connected through urethane linkages. The arrangement of the hard and soft segments in the polymer chain can therefore be represented as follows:

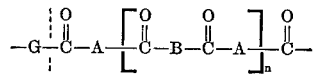

Soft Segment          Hard Segment wherein G, A, B and $n$ are as defined above. The end groups of the polymer are amines or hydroxyls, the latter resulting from hydrolysis of the chloroformate group. The presence of the above-described segments and the connecting urethane linkages is evident from the known chemistry of the reactants used, infrared spectroscopy and melting point studies of the polymers.

The hard segments of the subject polymers are high melting crystalline moieties prepared by reacting the haloformate of a low molecular weight diol with a primary or secondary diamine. They consist of at least 2 repeating units of the formula:

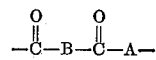

Preferably, they are sufficiently high melting that a high molecular weight homopolymer of these repeating units in the fiber-forming molecular weight range (about 5000 or higher), would melt at 150° C. or higher. However, less crystalline, lower-melting hard segments can also be used. The melting point and crystallinity of the hard segments depends on the low molecular weight diols and diamines used and the size of the hard segment (value of $n$), as will be discussed later.

The soft segments of the polymers are the residues remaining after removal of hydroxyl hydrogens from polyalkyleneether glycols having a molecular weight above 400 (preferably between 600 and 5000). Such polyethers melt below about 50° C.

A critical feature of the polymers of this invention is that the hard segments are monodisperse, which means the size of the hard segment in each repeating unit of the polymers, as described in the formulae given above, is the same. The value of $n$ is therefore constante throughout any quantity of polymer within the scope of this invention.

The polymers of this invention are prepared by preforming the hard segment to a predetermined size and reacting the resulting material with the bis-chloroformate of a polyalkyleneether glycol. In preparing the preformed hard segment from the diamine and diol, it is necessary to block one end of one of the difunctional reactants with a protective group such as benzylchloroformate in order to control the size of the segment as it is formed. A representative preparation of the hard segment wherein φ is phenyl and X and Y are the same as A and B, respectively, defined above, without the amine nitrogens and diol oxygens, is given below (the amine exemplified is a secondary diamine):

(1) 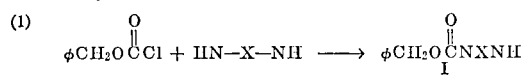

(2) 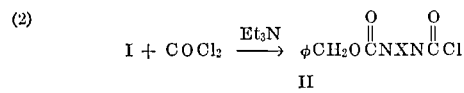

(3) 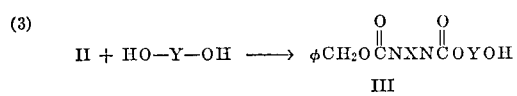

(4) 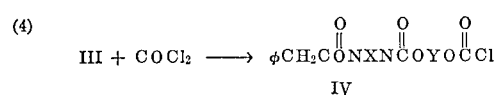

(5)
2(IV) + HN—X—NH $\xrightarrow{Na_2CO_3}$
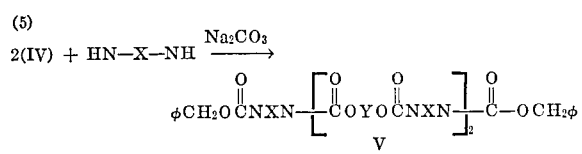

(6) 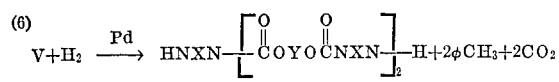

Compound VI is typical of the smallest hard segments which can be reacted with a polyalkyleneether glycol to prepare segmented polymers within the scope of this invention. Those skilled in the art will recognize that higher molecular weight hard segments in which $n$ is an even number can be prepared by reacting compound VI with 2 moles of compound IV, treating the resulting material (wherein $n=4$) with hydrogen and palladium catalyst and, if desired, continuing to react the resulting amino-terminated hard segments with compound IV and removing the blocking groups until the desired value of $n$ is obtained. Hard segments in which $n$ is 3 or a higher odd number are prepared by forming compound I as indicated above and proceeding as follows:

(7) 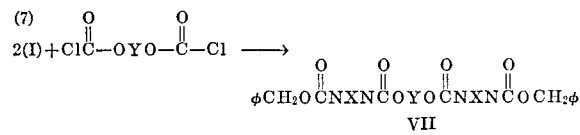

(8) 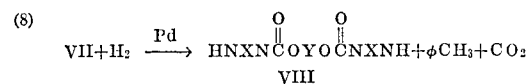

(9) 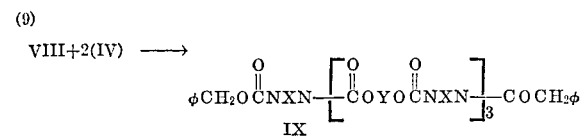

(10) 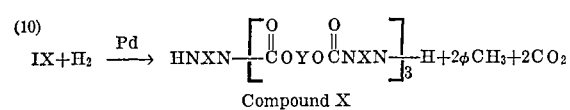

Compound X

Hard segments of higher molecular weight in which $n$ is an odd number are prepared by reacting compound X with compound IV, treating the resulting polymer with hydrogen and palladium catalyst and continuing to react the resulting amino-terminated hard segment with compound IV and removing the blocking groups until the desired value of $n$ is obtained.

The segmented polymers of this invention are prepared by reacting one of the hard segments described above with the bis-chloroformate of a polyalkyleneether glycol as illustrated by the following representative reaction:

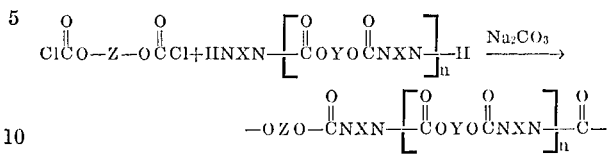

wherein $n$ is constant throughout the polymer, Z is the same as G, defined above, without hydroxyl oxygens, and the end groups are amines or hydroxyls depending on the proportions of reactants used.

The segmented polyurethanes of this invention are unique in that the hard segments of the polymer are monodisperse. Consequently, the polymers have greater crystallinity and thus sharper and better defined melting points than the polydisperse segmented polyurethanes of the prior art. These properties are reflected in a substantial increase in modulus and tensile strength of the polymers of this invention. The polymers of this invention are therefore a special class of the linear polymers of the prior art which have no cross links but which exhibit properties equivalent to those of cured, crosslinked elastic products.

The proportion of hard segments to be built into the polymer chain depends on the use to be made of the polymer. As the proportion of hard segments increases, the polymers become increasingly crystalline, hard and inflexible to the point they are a hard plastic. Conversely, as the hard segment proportion decreases, the polymer loses its crystallinity and becomes softer and more flexible. At very low hard segment contents, the polymer is a soft elastomer. For use in applications such as elastomeric fibers, coatings, and molded goods, it is preferred that the hard segment be about 10–50% by weight of the total polymer. The preferred value of $n$ is about 3–6 since the resulting polymers have good physical properties and can be prepared from readily available starting materials.

The diamines used as components for the hard segments can be primary or secondary aliphatic, alicyclic, aromatic or heterocyclic diamines. Representative diamines include ethylene diamine, propylene diamine, tetramethylene diamine, pentamethylene diamine, hexamethylene diamine, heptamethylene diamine, octamethylene diamine, piperazine, 2,5-dimethylpiperazine, p-xylylene diamine, 1,4-diaminocyclohexane, p-phenylene diamine, bis(p-aminocyclohexyl)methane, 1,3 - di(4-piperidinyl)propane and many others. Mixtures of diamines can also be used. Derivatives of the diamines can be used so long as the substituents do not interfere with the polymerization reactions. For example, the aliphatic diamines used can have hydrocarbon side chains or be substituted with halogens.

The low molecular weight diols used with the diamines to prepare the hard segments include aliphatic, aromatic, mixed aliphatic-aromatic or cycloaliphatic diols. Examples include ethylene glycol, propane diols, butane diols, pentane diols, o-, m-, and p-xylylene glycol, cyclohexane diol, hydroquinone, 2,5-dihydroxydioxane, resorcinol, catechol and 4-methyl resorcinol. As with the diamines, mixtures of the diols can be used and the diols can be substituted with groups that do not interfere with the reactions required in preparing intermediates and the ultimate polymerization reaction.

In general, diamines and diols which form hard segments having melting points of 150° C. or higher at a molecular weight above 5000 should be used. That is, diamines and diols that can be connected through urethane linkages to form a polymer having a molecular weight greater than 5000 which melts at least as high as 150° C. are preferred though other diamines and diols can be used.

The symmetrical diols and diamines are preferred since they lead to more crystalline, higher melting, hard segments. The preferred ultimate segmented polymers resulting from these symmetrical diols and diamines, therefore, have increased modulus and tensile strength. Preferred symmetrical diamines include polymethylene diamines of the formula $H_2N(CH_2)_nNH_2$ wherein $n$ is 2-6, 1,4-cyclohexanediamine, p-phenylenediamine, piperazine, 2,5-dimethylpiperazine, and 1,3-di(4-piperidinyl)propane. Piperazine is particularly preferred since it readily undergoes polymerization reactions as described above to form highly crystalline hard segments. Preferred symmetrical diols include alkylene diols of the formula $HO(CH_2)_nOH$ wherein $n$ is 2-6, 1,4-cyclohevanediol and hydroquinone. 1,4-butanediol is especially preferred because of its availability and the high melting crystalline hard segments which it forms.

The polyalkyleneether glycols which make up the soft segments of the polymer have molecular weights greater than 400 and preferably from about 600–5000. They melt below 50° C. Polyalkylene thioethers can also be used. Representative polyethers include the polyoxathioalkylene glycols, such as poly(1-oxa-4-thiahexane), poly(1,4-dioxa-7-thianonane), and poly(1,6-dioxa-9-thiahendecane); the poly(alkyleneether) glycols, such as poly(ethyleneether) glycol, poly(propyleneether) glycol, poly(tetramethyleneether) glycol, and poly(decamethyleneether) glycol; polydioxolane, and polyformals prepared by reacting formaldehyde with other glycols or mixtures of glycols, such as tetramethylene glycol and pentamethylene glycol. Some of the alkylene radicals in these polyethers can be replaced with arylene or cycloaliphatic radicals. The preferred polyether is poly(tetramethyleneether) glycol because of the elastomeric character and water resistance of polymers prepared from it.

As indicated above in the descriptions of the preparation of the hard segments and the reaction of the hard and soft segments, the components are not reacted directly. Instead, one component is first converted to the corresponding haloformate or carbamoyl chloride which is then reacted with the other component. The haloformates can be the chloro-, bromo-, iodo- or fluoroformate, but usually the chloroformates will be employed since they are easily prepared from phosgene.

The segmented polymers of this invention have an inherent viscosity greater than 0.5 and preferably greater than 2.0. Polymers in the lower molecular weight range are useful in applications such as the preparation of molded objects. Polymers of higher molecular weight i.e., above about 5000 are useful as fibers. Inherent viscosity is defined as:

$$\frac{\ln \eta_r}{C}$$

wherein $\eta_r$ is the ivscosity of a dilute solution of the polymer divided by the viscosity of the solvent in the same units and at the same temperature, and C is the concentration in grams of the polymer per hundred ml. of solution. The inherent viscosity values given herein are based on a solution of polymer in m-cresol at 30° C. (0.1 gram in 100 ml. of solution).

The polymers of this invention are useful in making polyurethane fibers, coatings and cast objects, particularly where tough durable polymers with high modulus and tensile strength are required. The polymers need not be cured by cross-linking to form a useful product. Procedures well known in the art for preparing coatings and cast elastomers from conventional crosslinked elastomers are applicable here. Because of their crystallinity, the polymers of this invention are especially useful in injection molding where the polymer is heated above its melting point and injected into a mold, as the polymer rapidly solidifies to the desired shape. Because the polymers are readily soluble in solvents such as methylene chloride, chloroform, trichloroethylene and mixed solvents such as toluene and ethanol, they are well suited for use as lacquers. As fiber-forming materials the polymers can be melt, dry, or wet spun by procedures well known in the art such as those described for polydisperse hard segment polymers in U.S. Pat. 2,929,802 to Katz.

The reaction of the polyether bis-chloroformate and amine-terminated hard segment can be carried out by interfacial polymerization or solution polymerization as generally described in columns 7 and 8 of U.S. Pat. 2,929,802 to Katz.

In interfacial polymerization, the solvents are usually water and an organic solvent in which the polyether bischloroformate and hard segment are soluble, e.g., methylene chloride, chloroform and trichloroethylene. An acid acceptor soluble in the water phase such as sodium carbonate, potassium carbonate or a tertiary amine must be present. The reaction temperature varies from about 0–60° C. The preferred procedure is to dissolve the bischloroformate in one portion of the organic solvent, the amine hard segment in another portion of the same solvent, combining these two portions and mixing the resulting solution with the water-acid acceptor solution. Vigorous agitation is maintained during the reaction.

In solution polymerization, an acid acceptor is used which is soluble in the solvent employed. Since the solvent is usually one of the organic solvents mentioned above, the preferred acid acceptors are tertiary amines.

The reactions employed in preparing the hard segments (see description above) are generally of five types, (1) production of chloroformates by reacting a diol with phosgene, (2) production of carbamoyl chlorides by reacting a diamine with phosgene, (3) reaction of a chloroformate with a diamine, (4) reaction of a carbamoyl chloride with a diol, or (5) removal of protective groups such as benzyl chloroformates.

The first type reaction is generally carried out by adding the diol or diamine to liquid phosgene at about 0–30° C. and removing the by-products at low temperature, i.e., about 50° C. or lower. The second type is carried out similarly except a tertiary amine is present and the reaction is preferably carried out at −60 to −80° C.

The third type reaction can be carried out substantially as described above in the polyether bischloroformate hard segment reaction.

The fourth type reaction of the carbamoyl chlorides and diols is carried out in an organic solvent in which both reactants and an acid acceptor are soluble, e.g., methylene chloride or chloroform. The acid acceptor is a tertiary amine. A large excess of diol is used and the reaction temperature is about 100–150° C.

The fifth type reaction in which the protective groups are removed is known in the art as hydrogenolysis. The compound containing the protective groups is contacted with hydrogen in the presence of a palladium catalyst. Preferably, the compound undergoing hydrogenolysis is dissolved in glacial acetic acid. Standard hydrogenation equipment such as a Parr hydrogenation apparatus can be used. The rate of reaction increases as the pressure of the hydrogen increases. The pressure can vary from about atmospheric to about 400 p.s.i.g. Preferably, the temperature ranges from 0–60° C.

The invention is further illustrated by the following examples wherein parts and percentages are by weight unless otherwise indicated. Throughout the description of the preparation of intermediate materials and the examples $\phi$=phenyl, BDO=1,4-butanediol, Pip=piperazine and PTMEG=polytetramethyleneether glycol of molecular weight 1000.

PREPARATION OF THE INTERMEDIATE MATERIALS

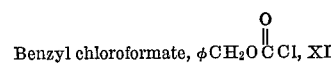
Benzyl chloroformate, $\phi CH_2O\overset{O}{\underset{\|}{C}}Cl$, XI The reaction is carried out in a 3 liter flask equipped with agitator, addition funnel, $N_2$ inlet tube, and reflux condenser which is cooled with circulating acetone at −70° C. and which is connected in series to a drying tube, bubbler, and ammonia scrubber. Distilled benzyl alcohol (13.5 moles, 1460 g.) is added dropwise with good agitation to refluxing phosgene (20.25 moles, 2001 g.) over a period of 5 hours at 7–9.5° C. The mixture is allowed to stand overnight in a Dry Ice/acetone bath, after which HCl and excess phosgene are removed by sparging with nitrogen in vacuo. The product weighs 2300 g. and contains 20.3% active chloride (theory 20.78%).

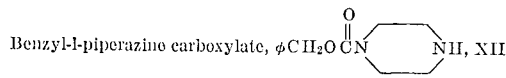

Benzyl-1-piperazino carboxylate, $\phi CH_2OCN$ ... $NH$, XII

Benzylchloroformate (1.18 moles, 170.6 g.) and 4 N NaOH (688 cc.) are added with agitation at 25° C. to a solution composed of bromophenol blue indicator (0.04%, 60 cc.), piperazine (2 moles, 172.3 g.), concentrated HCl (326 cc.), $H_2O$ (500 cc.), and methanol (1000 cc.) at relative rates such that the pH is maintained in the range 3.0–4.5. After addition is complete, the methanol is distilled in vacuo, 1000 cc. of $H_2O$ added, and the pH adjusted to Congo Red end point, and the mixture extracted with benzene to remove

The pH of the aqueous solution is then adjusted to 13 with 12.5 N NaOH after which the product is extracted with benzene. After removal of the benzene, 231.8 g. (89.2%) of XII is obtained. Purity by potentiometric titration is 98.2%. A sample of the crude product recrystallized at −70° C. from petroleum ether/diethyl ether has the following analysis:

Theory (percent): C, 64.06; H, 6.84; N, 13.59. Found (percent): C, 65.25; H, 7.4; N, 12.55.

4-Carbobenzyloxy-1-piperazine carbamyl chloride,

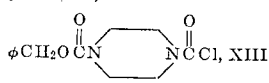

A solution of crude benzyl-1-piperazine carboxylate (1.5 moles, 330.5 g.), triethylamine (1.5 moles, 151.8 g.), and dry ether (1800 ml.) is added dropwise with good agitation at −65° C. to −60° C. over a 2-hour period to a solution of phosgene (7.5 moles, 742 g.) in dry ether (450 ml.). Stirring is continued for ½ hour after addition is complete. The mixture is filtered, the filter cake washed with dry ether (2000 ml.), and the filtrate evaporated to dryness in vacuo. Crude XIII, a white crystalline solid, is obtained in 386.9 g. (91.2%) yield and melts at 58.5–60° C.

*Analysis.*—Calcd. for $C_{13}H_{15}ClN_2O_3$ (percent): C, 55.22; H, 5.35; Cl, 12.54; N, 9.91. Found (percent): C, 55.3; H, 5.3; Cl, 12.6; N, 9.95.

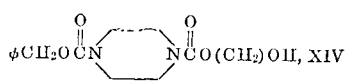

Crude 4-carbobenzyloxy-1-piperazine carbamyl chloride, XIII, (1.827 moles, 516.4 g.), 1,4-butanediol (0.6 mole, 54.07 g.) and dry pyridine (50 ml.) are heated at 137° C. for one hour. The reaction mixture is cooled, diluted with water (100 ml.), and extracted 3 times with 100 ml. portions of methylene chloride. The extract is washed in succession with water, 10% HCl, 5% sodium carbonate and water. It is then dried over sodium sulfate, filtered, and the solvent removed from filtrate in vacuo. Crude XIV, a viscous liquid which slowly crystallizes at room temperature, is obtained in 32.9 g. (97.8%) yield.

*Analysis.*—Calcd. for $C_{17}H_{24}N_2O_5$ (percent): C, 60.70; H, 7.19; N, 8.33. Found (percent): C, 59.6; H, 7.15; N, 7.88.

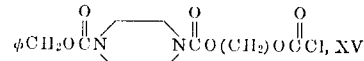

A solution of XIV (0.5 mole, 168.2 g.) in dry tetrahydrofuran (135 ml.) is added dropwise with good agitation to liquid phosgene (1.5 moles, 148 g.) at 1–22° C. over a period of 75 minutes. After a two-hour hold period, the solvent and excess phosgene are removed by sparging with nitrogen in vacuo. Crude XV, a clear liquid is obtained in 198.7 g. (99.7%) yield and contains 8.44% active Cl (theory 8.89%), indicating a purity of 95.0%.

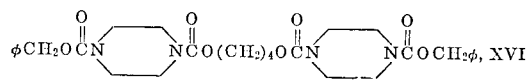

A solution of 1,4-butanediol bischloroformate (0.5 mole, 107.52 g.) in cold, dry methylene chloride (1612 ml.) is added rapidly with intense agitation to an aqueous solution composed of XII, (1.0 mole, 220.68 g.), sodium carbonate (1.0 mole, 106 g.) and $H_2O$ (954 ml.) contained in a 1-gal. high-speed mixer. After stirring for 10 min. the methylene chloride phase is separated and washed with $H_2O$, the solution dried with sodium sulfate, and the solvent removed by evaporation. The crude product is recrystallized from denatured (2B) alcohol. Purified XVI is obtained in 286.7 g. (98.4%) yield. It melts at 136.4–137.0° C.

Calcd. for $C_{30}H_{38}N_4O_8$ (percent): C, 61.8; H, 6.57; N, 9.62. Found (percent): C, 61.8; H, 6.5; N(Dumas) 9.6.

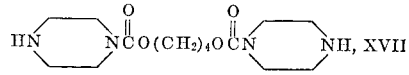

A mixture of XVI, (.05 mole, 29.13 g.), glacial acetic acid (167 ml.), and catalyst (5% palladium on activated charcoal, 2.91 g.) is treated with hydrogen in a Parr hydrogenation apparatus for 2 hours at an initial pressure of 54 p.s.i.g. A change in pressure of 6 p.s.i. occurs in 11 minutes. The catalyst is removed by filtration and most of the acetic acid by evaporation in vacuo. After dissolving the residue in water and adjusting the pH to about 13 with KOH solution, the product is extracted with methylene chloride. Evaporation of the methylene chloride yields 14.5 g. (92% yield) of a white crystalline solid. Recrystallization from heptane produced needles of XVII which melt at 97–98° C.

Calcd. for $C_{14}H_{26}N_4O_4$ (percent): C, 53.5; H, 8.34; N, 17.82. Found (percent): C, 53.8; H, 8.35; N, 17.7.

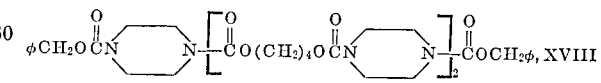

A solution of crude XV (94.5% pure, .3437 mole, 122.4 g.) in methylene chloride ($CH_2Cl_2$, 200 ml.) is mixed in a 1-gal. high-speed mixer with a solution of anhydrous piperazine (0.1685 mole, 14.59 g.) in $CH_2Cl_2$ (776 ml.). Anhydrous triethylamine (.378 mole, 38.3 g.) is then added and the mixture stirred for 10 minutes. The $CH_2Cl_2$ solution is washed in succession twice with $H_2O$ (500 ml.), once with 5% HCl (500 ml.), and once with $H_2O$ (500 ml.). The solvent is removed by evaporation in vacuo in a rotary evaporator. Crude XVIII is obtained in 118.3 g. (86.6%) yield. Recrystallization from a 3:1 ethanolchloroform mixture produces a white crystalline solid melting at 167–167.5° C.

Calcd. for $C_{40}H_{54}N_6O_{12}$ (percent): C, 59.3; H, 6.71; N, 10.37. Found (percent): C, 5.93; H, 6.75; N, 10.2.

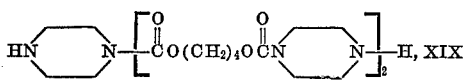, XIX

A mixture of XVIII, (0.037 mole, 30.0 g.), glacial acetic acid (195 ml.), and catalyst (5% palladium on activated charcoal, 3.0 g.) is treated with hydrogen in a Parr hydrogenation apparatus for 2 hours at an initial pressure of 54 p.s.i.g. A change of pressure of 6–6.5 p.s.i. is obtained within 30 minutes. The catalyst is removed by filtration and most of the acetic acid by evaporation in vacuo. The residue is dissolved in $H_2O$, the pH adjusted to above 13 with KOH solution, and the aqueous solution extracted with $CH_2Cl_2$. Evaporation of the $CH_2Cl_2$ yields 19.3 g. (96.0% yield) of crude XIX. Recrystalliation from a 1:3 heptane-benzene mixture produces 16.24 g. (80.9% yield) of a white crystalline solid which melts at 126.5° C. and which is 99.1% pure by amine titration.

Calcd. for $C_{24}H_{42}N_6O_8$ (percent): C, 53.12; H, 8.02; N, 15.49. Found (percent): C, 53.4; H, 7.95; N, 15.25.

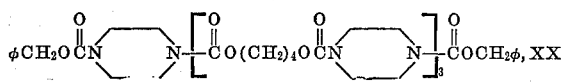, XX

Solid XVII, (0.236 mole, 74.29 g.) is added with good agitation to a solution of crude XV (0.473 mole, 200.23 g.) in $CH_2Cl_2$ (1500 ml.). After ½ minute, a solution of sodium carbonate ($Na_2CO_3$, 0.493 mole), 52.22 g. in $H_2O$ (470 ml.) is added and the emulsion stirred for 10 minutes. The two phases are separated, and the $CH_2Cl_2$ phase is washed 3 times with $H_2O$ (300 ml.) and then dried over $Na_2SO_4$. Evaporation of the solvent yields 251.3 g. (theory, 246 g.) of crude XX. After recrystalliation from a 1:3.64 chloroform-ethanol mixture, the purified product is obtained in 225.6 g. (91.7%) yield. It melts at 180–181° C.

Calcd. for $C_{50}H_{70}N_8O_{16}$ (percent): C, 57.8; H, 6.79; N, 10.8. Found (percent): C, 57.6; H, 6.8; N(Kj), 10.6.

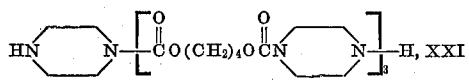, XXI

A mixture of X, (0.03 mole, 31.17 g.), glacial acetic acid (195 ml.), and catalyst (5% palladium on activated charcoal, 3.12 g.) is treated with hydrogen in a Parr hydrogenation apparatus for 2 hours at initial temperature of 50° C. and 54 p.s.i.g. A total change in pressure of 5 p.s.i. occurs. The catalyst is removed by filtration and most of the acetic acid by evaporation in vacuo. The residue is dissolved in $H_2O$, the pH is adjusted to above 13 with KOH solution, and the product is extracted with $CH_2Cl_2$. After drying the solution over sodium sulfate ($Na_2SO_4$) and evaporation of the solvent, crude XXI is obtained in 23.3 g. (101%) yield. Purification by recrystallization from a 1:8.3 $H_2O$-tetrahydrofuran mixture produces a white powdery solid in 20.5 g. (88.8%) yield. Titration for amine indicates 2.52 meq./g. or a purity of 98.1%.

Calcd. for $C_{34}H_{58}N_8O_{12}$ (percent): C, 53.0; H, 7.58; N, 14.5. Found (percent): C, 53.1; H, 7.6; N, 14.6.

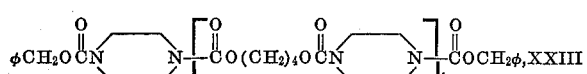,XXIII

Solid XIX (0.181 mole, 98.4 g.), is added with good agitation to a solution of crude XV (0.369 mole, 158.1 g.), in $CH_2Cl_2$ (1267 ml.). After ½ minute, a solution of $Na_2CO_3$ (0.435 mole, 46.1 g.) in $H_2O$ (415 ml.) is added and the emulsion stirred for 10 minutes. The two phases are separated, and the $CH_2Cl_2$ phase is washed in succession twice with $H_2O$ (200 ml.), twice with 5% HCl (200 ml.), and twice with $H_2O$ (200 ml.). After drying the $CH_2Cl_2$ solution with $Na_2SO_4$, the solvent is evaporated, and crude XXII is obtained in 236.7 g. (103%) yield. It is recrystallized from a 1:3 chloroform-ethanol mixture to produce a 200 g. (87.3%) yield of white powdery solid melting at 184–186° C.

Calcd. for $C_{60}H_{86}N_{10}O_{20}$ (percent): C, 56.9; H, 6.84; N, 11.05. Found (percent): C, 56.9; H, 6.8; N, 10.9.

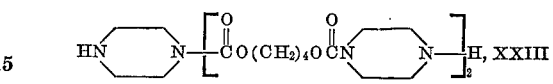, XXIII

XXII (0.025 mole, 31.68 g.) is dissolved at 50–60° C. in glacial acetic acid (195 cc.), catalyst (5% palladium on activated charcoal) is added, and the mixture treated with hydrogen in a Parr hydrogenation apparatus for 2 hours at an initial temperature and pressure of 55° C. and 55 p.s.i.g. A total change in pressure of 4–4.5 p.s.i. occurs. Catalyst is removed by filtration and most of the acetic acid by evaporation in vacuo. The residue is dissolved in $H_2O$, the pH adjusted to above 13 with KOH solution, and the product extracted with $CH_2Cl_2$. After drying the solution with $Na_2SO_4$ and evaporation of the solution to dryness, crude XXIII is obtained in 24.6 g. (98.4%) yield. Purity based on titration for amine content is 90.0%. Recrystallization from 1:9 $H_2O$-tetrahydrofuran raises purity to 93.5%. Dissolution of the recrystallized product in $CH_2Cl_2$, filtration of solution to remove insolubles, and precipitation of the product with petroleum ether increases purity to 95.7%.

Final purification is carried out by dissolution of the product in aqueous ethanol, adjustment of pH to above 13, extraction with $CH_2Cl_2$, washing of the extract with $H_2O$, and evaporation to dryness. The solid is then dissolved in $CH_2Cl_2$ and precipitated with petroleum ether. The product thus isolated has a purity of 98.75%.

EXAMPLES 1–3

Preparation of BDO/PTMEG/piperazine polymers with monodisperse hard segment length distributions All of the polymers in this series are prepared according to the same general recipe and procedure described below.

| | Moles | Amount |
|---|---|---|
| Polytetramethyleneether glycol (1000 Mol. Wt.) bischloroformate, 6.37 percent Cl. | 1.00 | |
|  | 1.05 | |
| $Na_2CO_3$ | 2.40 | |
| $H_2O$ | | To give 10 wt. percent $Na_2CO_3$ solution. |
| $CH_2Cl_2$ | | 10 ml./g. polymer. |
| Antioxidant 4,4-butylidene-$bis$-(3-methyl-6-$tert$.-butyl phenol) (3 parts) and 2,2-methylene-$bis$(4-methyl-6-$tert$.-butylphenol) (1 part). | | 1 wt. percent based on polymer. |

[1] XIX—Example 1. XXI—Example 2. XXIII—Example 3.

Solid  is added to the solution of bischloroformate in $CH_2Cl_2$ in a 1-quart high-speed mixer. As soon as the solid dissolves, the aqueous $Na_2CO_3$ solution is added, and the emulsion is stirred for 8 minutes. The antioxidant mixture is added to the polymer emulsion and the polymer is isolated in the mixer by evaporation of the $CH_2Cl_2$ with steam. The polymer is washed free of salts with hot water and dried in a vacuum oven at about 75° C. In the case of low-melting polymers, the molten polymer is redissolved in $CH_2Cl_2$ during the washing steps. Characterization data for this series of polymers is shown in the following table.

PROPERTIES OF BDO/PTMEG/PIPERAZINE POYMLERS WITH MONODISPERSE HARD SEGMENT LENGTH DISTRIBUTIONS

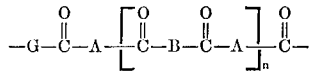

POLYMER REPEAT SEGMENT

| Example | $n$ | BDO/PTMEG-1,000 pip molar ratio | Percent N. Theory | Percent N. Found | Inherent viscosity 30° C. m-cresol | Inherent viscosity 30° C. $CHCl_3$ |
|---|---|---|---|---|---|---|
| 1 | 2 | 2¾ | 5.26 | 5.18 | 2.61 | 1.91 |
| 2 | 3 | 3½ | 6.07 | 6.08 | 2.59 | 1.87 |
| 3 | 4 | 4¾ | 6.80 | 6.75 | 2.13 | 1.51 |

Analysis by infrared spectroscopy confirms the presence of the expected urethane linkages.

Physical properties of the segmented polyurethane are given in the table which follows:

PHYSICAL PROPERTIES OF POLYURETHANES HAVING MONODISPERSE HARD SEGMENTS

| Example No. | 1 | 2 | 3 |
|---|---|---|---|
| Moles hard segment/kg. polymer | 0.6317 | 0.5470 | 0.4904 |
| Wt. percent, hard segment | 37.6 | 46.0 | 51.6 |
| Stress-strain properties: | | | |
| $M_{100}$, p.s.i. | 960 | 1,480 | 1,840 |
| $M_{200}$, p.s.i. | 1,060 | 1,590 | 2,000 |
| $M_{300}$, p.s.i. | 1,380 | 1,990 | 2,370 |
| $M_{400}$, p.s.i. | 1,710 | 2,410 | 2,900 |
| $M_{500}$, p.s.i. | 2,050 | 3,000 | 3,610 |
| $M_{600}$, p.s.i. | 2,470 | 4,630 | 5,250 |
| $M_{700}$, p.s.i. | 3,410 | | 8,125 |
| Tensile strength at break, p.s.i. | 6,200 | 7,700 | 9,200 |
| Elongation at break, p.s.i. | 780 | 685 | 720 |
| Permanent set, percent | 115 | 173 | 236 |
| Bashore resilience | 61 | 68 | 65 |
| Hardness, Shore A | 95 | 96 | 97 |
| Compression set, 22 hrs./70° C | 75 | 56 | 52 |

When segmented polyurethanes (prepared from the same monomers) containing polydisperse hard segments in which the average value of $n$ is 2, 3 or 4 are compared with the polymers of Examples 1–3, the latter have substantially higher modulus and tensile strength and greater Shore A hardness.

The following ASTM methods were used to obtain the above data: Tensile strength—D–412; modulus—D–412; elongation at break—D–412; Bashore resilience—D–1054; hardness—D–676 and compression set—D–395.

What is claimed is:
1. A segmented polyurethane comprised essentially of soft segments and monodisperse hard segments, said polyurethane corresponding to repeating units of the formula:

$$-G-\overset{O}{\underset{\|}{C}}-A-\left[\overset{O}{\underset{\|}{C}}-B-\overset{O}{\underset{\|}{C}}-A-\right]_n\overset{O}{\underset{\|}{C}}-$$

wherein G is a bivalent radical obtained by removing the hydroxyl hydrogen atoms from a polyalkyleneether glycol having a molecular weight greater than 400 and a melting point less than 50° C., B is a bivalent radical obtained by removing the hydroxyl hydrogen atoms from a diol having a molecular weight less than 400, A is a bivalent radical obtained by removing a hydrogen atom from each amino group of a primary or secondary diamine and $n$ is an integer of 2–12.

2. A composition of claim 1 wherein the hard segments of the polymer have a sufficiently high melting point that a homopolymer of said hard segments has a melting point above about 150° C. at a molecular weight above about 5000.

3. A composition of claim 1 wherein the diamine and diol having a molecular weight below about 400 are symmetrical compounds.

4. A composition of claim 3 wherein the diamine is a secondary diamine.

5. A composition of claim 1 wherein the segmented polyurethane has an inherent viscosity in m-cresol of at least about 2.0 as measured on a solution of 0.1 gram polymer in 100 milliliters of solvent at 30° C.

6. A polymer of claim 1 wherein the hard segments constitute about 10–50% by weight of said polyurethane and $n$ is from 3 to 6.

7. A composition of claim 1 wherein the polyether glycol has a molecular weight of about 600–5000.

8. A composition of claim 7 wherein the diamine is a symmetrical secondary diamine and the diol of molecular weight below about 400 is a symmetrical diol and $n$ is from 3–6.

9. A composition of claim 8 wherein the diamine is piperazine, the diol is 1,4-butanediol and the polyether glycol is poly(tetramethyleneether) glycol.

10. A composition of claim 9 wherein the segmented polyurethane has an inherent viscosity in m-cresol of at least about 2.0 as measured on a solution of 0.1 gram polymer per 100 milliliter of solution at 30° C. and the hard segments constitute about 10–50% by weight of the polymer.

References Cited

UNITED STATES PATENTS 2,929,802  3/1960  Katz _____ 260—77.5
2,962,470  11/1960  Jung _____ 260—75 XR
3,044,987  7/1962  Schaefgen et al. _____ 260—75

DONALD E. CZAJA, Primary Examiner

M. J. WELSH, Assistant Examiner

U.S. Cl. X.R.
260—33.4, 33.6, 33.8, 45.95